Nov. 22, 1927.
G. N. RANDLE
1,650,154
URINAL FOR AUTOMOBILES AND THE LIKE
Filed Nov. 30, 1925
3 Sheets-Sheet 1
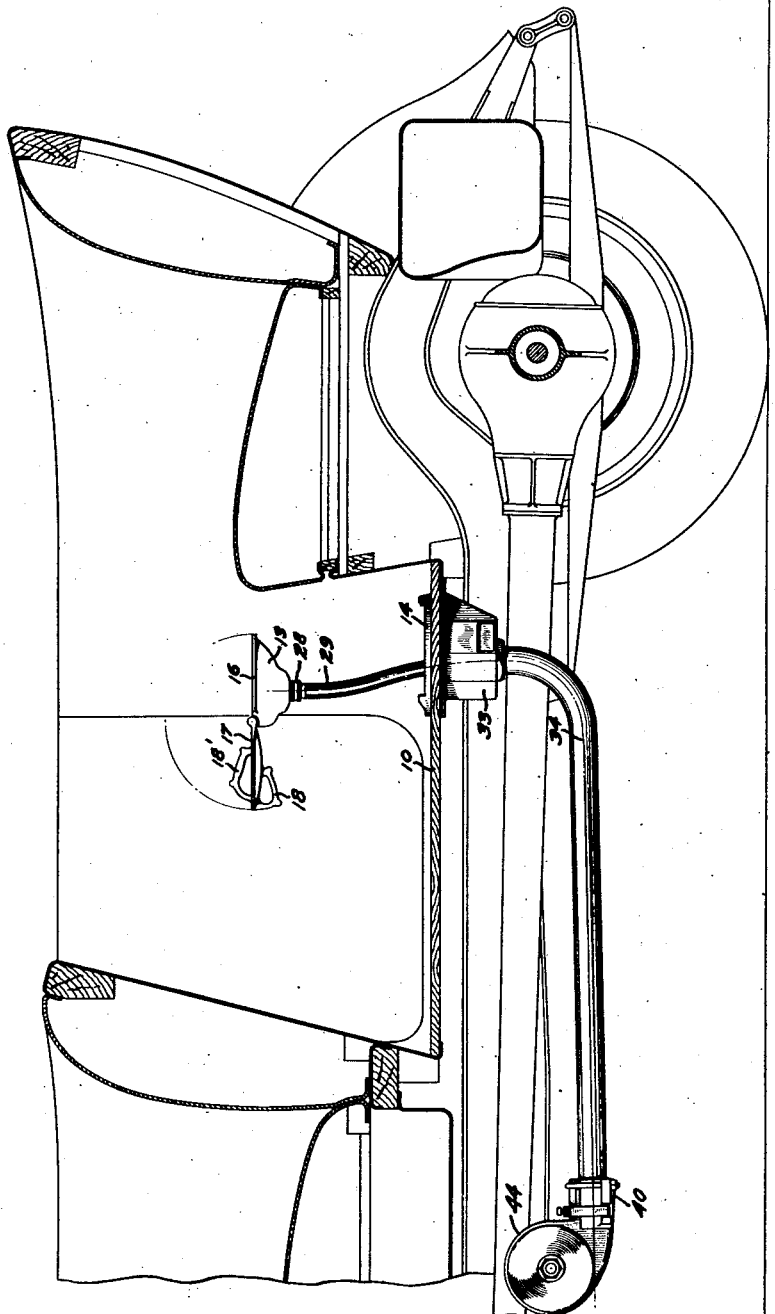

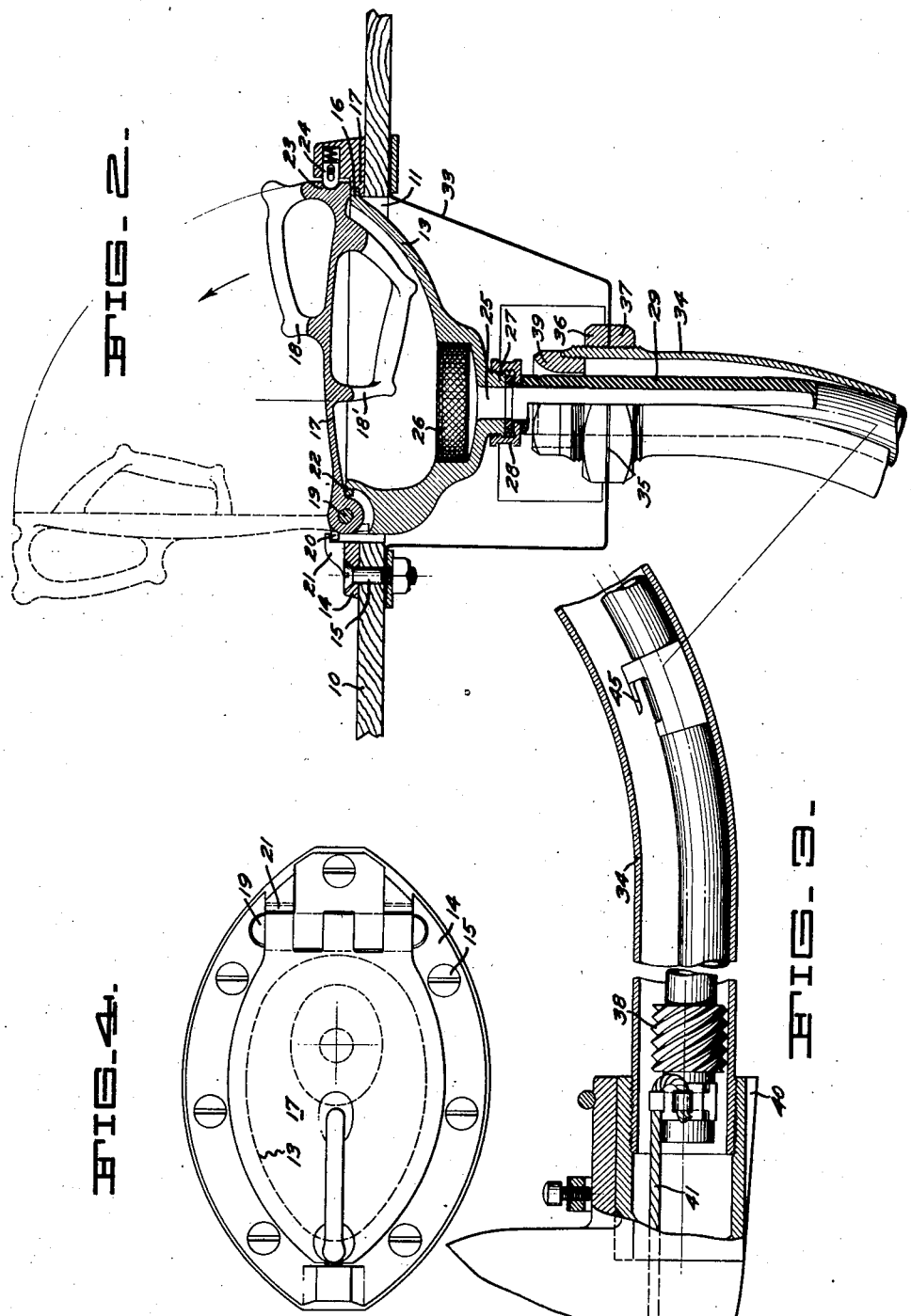

Nov. 22, 1927. 1,650,154
G. N. RANDLE
URINAL FOR AUTOMOBILES AND THE LIKE
Filed Nov. 30, 1925  3 Sheets-Sheet 3
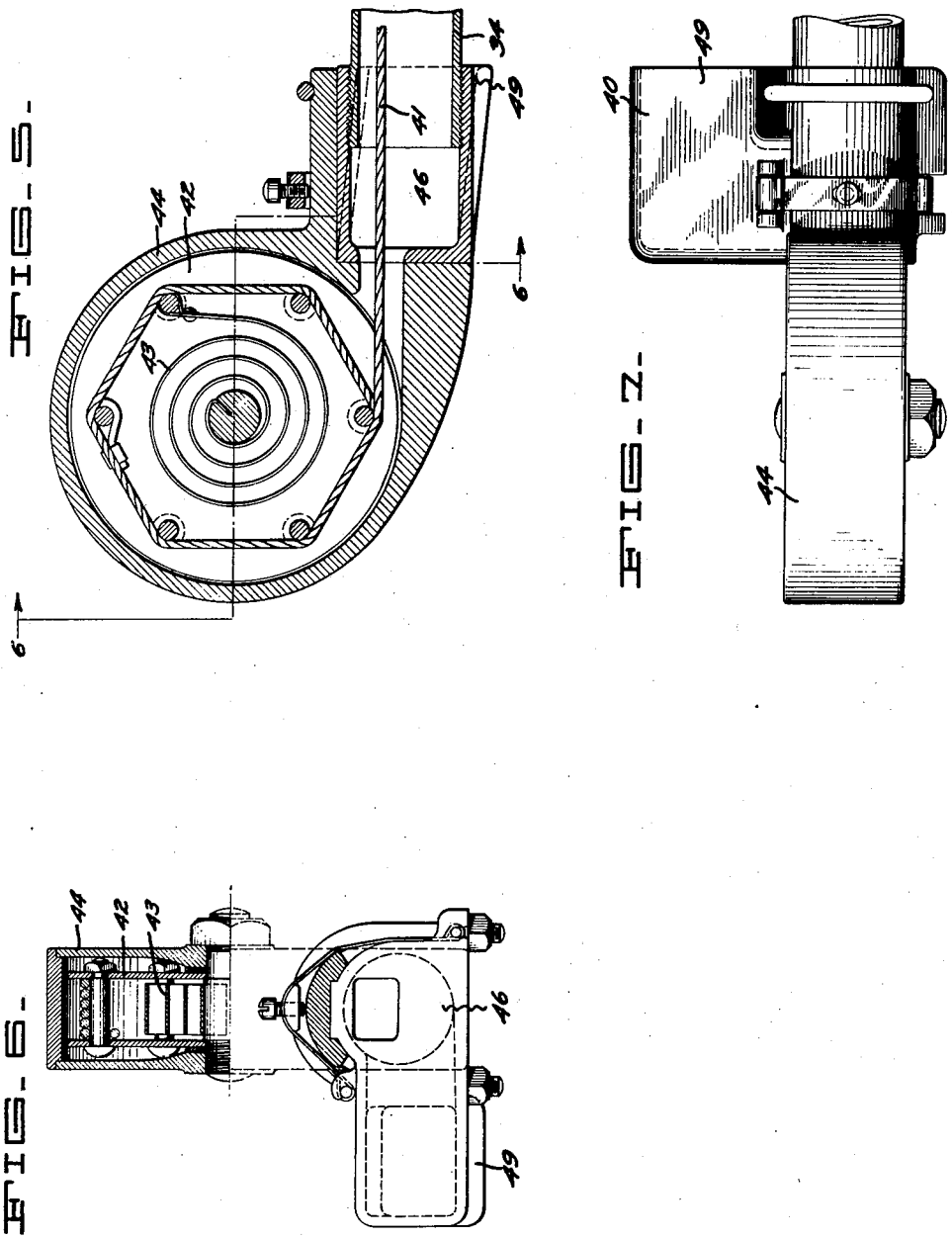
INVENTOR
GEORGE N. RANDLE Patented Nov. 22, 1927.

1,650,154

UNITED STATES PATENT OFFICE.

GEORGE N. RANDLE, OF OAKLAND, CALIFORNIA.

URINAL FOR AUTOMOBILES AND THE LIKE.

Application filed November 30, 1925. Serial No. 72,075.

This invention relates to a urinal for automobiles and the like and has for its object the provision of a simple and efficient device of this character. More particularly, the invention relates to a urinal of this character comprising a basin arranged normally to be positioned in an opening in the floor of the automobile and adapted to be removed therefrom to a seat or other convenient locations in the automobile for use.

Another object of the invention is to provide such a urinal having a discharge tube extending from the basin through said opening to a discharge means positioned below the floor of the automobile, the connection between said tube and discharge means being so arranged that the basin may be moved to various positions for use without interrupting said connection.

A further object of the invention is to provide a device of the character described so arranged as to form a compact unit occupying practically no room in the automobile, so as to avoid interfering with the comfort of passengers and which is readily accessible for convenient use.

A further object of the invention is to provide means for automatically returning said tube to its normal position within the discharge means after the device has been used.

The invention possesses another advantageous features, some of which with the foregoing, will be set forth at length in the following description, where I shall outline in full that form of my invention which I have selected for illustration in the drawings accompanying and forming part of the present specification. In said drawings I have shown one form of the device embodying my invention, but it is to be understood that I do not limit myself to such form, since the invention, as set forth in the claims, may be embodied in a plurality of forms.

Referring to the drawings:—

Figure 1 is a sectional view of part of an automobile equipped with a device embodying my invention, with the urinal shown in a raised or withdrawn position for use.

Fig. 2 is a sectional view, with parts shown in elevation, of a device embodying my invention, the cover being shown in closed position in full lines and in a vertical position in dotted lines. In this figure the lower portion of the device is broken away on account of lack of space on the sheet.

Fig. 3 shows a part of the lower portions of the device omitted in Fig. 2.

Fig. 4 is a plan view of the device as it appears in the floor of the automobile when not in use.

Fig. 5 is a central vertical section of the mechanism for returning the flexible tube connection between the basin and the discharge outlet to its normal position.

Fig. 6 is a section taken on the line 6—6 of Fig. 5; and

Fig. 7 is a plan view of Fig. 5.

In the drawings, the floor 10 of an automobile 11 is provided with an opening 12, which may occupy any convenient location. Preferably the opening is located on one side of the longitudinal axis of the automobile body and adjacent the edge of the seat, preferably the rear seat in the case of touring cars and the like. The opening 12 may assume any desired shape to conform to the shape of a basin 13, which in the present instance is shown as more or less oval. The opening 12 is surrounded by a metallic member 14 which is secured to the floor 10 by a plurality of bolts 15 on the top surface of the floor and which provides a support for the basin 13 in said opening. The basin 13 is provided with a peripheral flange 16, adapted to rest on a shoulder 17 formed on the inner edge of the member 14, so as to be supported thereon. The basin 13 is provided with a cover 17 which is pivoted thereon and arranged to move in a vertical plane from its closed position through 180° as indicated in Fig. 1, to its open position. Preferably the cover 17 is provided with a handle 18 on its top surface for convenience in moving the cover to its open position as well as for lifting the basin 13 from the opening 12 as will be further described hereinafter. It may also be provided with a handle 18' for convenience in manipulating the basin for use after the cover is opened and the basin is raised from the opening 12. The cover 17 is pivoted at 19 and provided with a lug 20 adapted to engage a shoulder 21 on base member 14 when the cover is closed, and a shoulder 22 on the basin when in its open position, so that the basin may be moved to desired position by grasping the handle 18'. The lug 20, by engaging shoulder 21, assists in holding the basin in the opening 12 when not in use. The cover 17 is also provided with a depression 23 adapted to be engaged by a plunger 24 on the member 14 thereby locking the unit in the opening 12 when not in use.

The basin 13 is provided with an outlet 25 in its bottom, and is suitably shaped adjacent the inner end of said outlet to accommodate a deodorant container 26. The outlet 25 is formed with an externally threaded collar or neck 27 adapted to receive a flanged hose coupling 28. A flexible tube or hose 29 is secured to the basin 13 adjacent the outlet 25 by means of the coupling 28 as shown.

A protective casing 33 is secured to the lower side of the floor 10 around the opening 12. This casing also supports a rigid discharge conduit 34. Said casing is provided with an opening 35, through which the conduit 34 extends. The conduit is externally threaded and secured to the casing by lock nuts 36 and 37 in a manner readily understood. The tube 29 extends into the conduit 34 and is slidable therein. At its free end, the hose is formed with an enlarged portion or head 38 which is spirally threaded on its exterior. From the foregoing, it will be seen that the basin 13 may be raised from the opening 12 and that the hose 29 slides within the conduit 34. In order to prevent the removal of the hose 29 from the conduit, the conduit is provided with a collar 39 at its inner open end adapted to engage the head 38, and thus limit the movement of the hose out of the conduit. The conduit 34 may extend toward the front or rear end of the automobile. If it extends forward as shown in Fig. 1, at its free end it is provided with a return bend element 40 directed toward the rear of the car, so as to secure a suction effect created by the passage of air over the outlet when the car is in motion.

While the device thus far described will function satisfactorily, it may be desirable to provide means for automatically drawing the tube 29 into the conduit 34 after the device has been used, instead of pushing the same therein manually. Such means, as well as a preferred form of return bend are shown in Figs. 5 to 7. A cable 41 is suitably secured at one end to the free end of the tube 29, as shown in Fig. 3. The opposite end of the cable is secured to a reel 42, normally urged in a clockwise direction, as seen in Fig. 5, by a spring 43, said reel and spring being housed in a casing 44, suitably supported on the return bend 40. At an intermediate point, the tube 29 is provided with a hook 45, shown in Fig. 3 adapted to fit over the collar 39. Thus when the basin is removed from the opening 12, the hook 45 may be hooked on the collar 39 and the spring 43 held while the device is being used, after which, the hook may be disengaged and said spring acts to draw the tube 29 to its normal position in conduit 34. The return bend may assume a variety of forms. Preferably, it comprises an element adapted to be fitted on the end of the conduit 34, formed with a passage 46 having an outlet 49 directed toward the rear of the car. Preferably, the passage 46 inclines downwardly from the outlet of tube 34, so as to facilitate the passage of fluid therethrough.

In view of the foregoing detailed description of a device embodying my invention, its operation will be readily understood from the following brief description thereof. When not in use, the several parts are in the position shown in Figs. 2 and 3. When the device is to be used, the cover 17 is moved to its horizontal position, and the basin 13 and its connected parts lifted from the opening 12, the hose 29 sliding within the conduit 34. Thereafter the basin may be returned to its original position, the hose sliding downwardly into the conduit, however, in this case, the threaded head 38 on the hose wipes and cleans the interior of the conduit 34. As above indicated, the hose or tube 29 may be returned manually or automatically. By directing the return bend 40 toward the rear of the car, the air currents passing over the same create a draft through the hose and conduit by suction, thereby insuring a rapid discharge flow through the same.

I claim:

1. A device of the character described comprising a basin removably positioned in an aperture in the floor of the automobile, a cover for said basin, means for holding said cover in either a vertical or a horizontal position, a fixed discharge conduit underneath said floor, and a flexible discharge means connected with said basin extending into said conduit and slidable therein.

2. A device of the character described comprising a basin removably positioned in an aperture in the floor of the automobile, a cover for said basin, means for holding said cover in either a vertical or a horizontal position, means engaging said cover in its horizontal position and thereby locking the basin in said aperture, a fixed discharge conduit underneath said floor, and a flexible discharge means connected with said basin extending into said conduit and slidable therein.

3. A device of the character described comprising a basin adapted to be removably positioned in an aperture in an automobile, a fixed discharge conduit, a flexible discharge tube connected with said basin extending into said conduit and slidable therein; and resilient means acting upon said tube for returning the same into said conduit when it is withdrawn therefrom.

In testimony whereof, I have hereunto set my hand.

GEORGE N. RANDLE.